US012313199B2

(12) United States Patent
Sweeney, Jr. et al.

(10) Patent No.: US 12,313,199 B2
(45) Date of Patent: May 27, 2025

(54) SYSTEM AND METHOD FOR TIGHTENING LOCK RINGS ONTO CONDUIT CONNECTORS

(71) Applicant: M.C. DEAN INC., Tysons, VA (US)

(72) Inventors: James Francis Sweeney, Jr., Tysons, VA (US); Toby Andrew Maguire, Tysons, VA (US)

(73) Assignee: ModularMC, LLC, McLean, VA (US)

( * ) Notice: Subject to any disclaimer, the term of this patent is extended or adjusted under 35 U.S.C. 154(b) by 311 days.

(21) Appl. No.: 17/720,939

(22) Filed: Apr. 14, 2022

(65) Prior Publication Data

US 2023/0332724 A1 Oct. 19, 2023

(51) Int. Cl.
*B25B 23/145* (2006.01)
*B25B 23/147* (2006.01)
*F16L 41/14* (2006.01)
*H02G 3/06* (2006.01)

(52) U.S. Cl.
CPC .......... *F16L 41/14* (2013.01); *B25B 23/1453* (2013.01); *B25B 23/1475* (2013.01); *H02G 3/0691* (2013.01)

(58) Field of Classification Search
CPC .. F16L 41/14; F16L 5/06; F16L 25/08; H02G 3/0691; B25B 13/06; B25B 23/1475; B25B 13/481; B25B 13/48
USPC ................................................. 81/436, 176.1
See application file for complete search history.

(56) References Cited

U.S. PATENT DOCUMENTS

| | | | |
|---|---|---|---|
| 2,909,090 A | 10/1959 | Moore | |
| 2004/0149469 A1* | 8/2004 | Colangelo, III | ...... B25B 21/026 173/93.5 |
| 2009/0301269 A1* | 12/2009 | Wedge | ................ B25B 13/5091 81/124.2 |
| 2009/0320652 A1 | 12/2009 | Allred et al. | |
| 2018/0281159 A1 | 10/2018 | Carnesi | |
| 2019/0219089 A1 | 7/2019 | Tomaszewski et al. | |

OTHER PUBLICATIONS https://tnb.ca/en/pdf-catalogues/fittings-and-conduit-systems/industrial-fittings/rigid-and-intermediate-metal-conduit-fittings.pdf (Year: 2021).*

* cited by examiner

*Primary Examiner* — Tom Rodgers
(74) *Attorney, Agent, or Firm* — Studebaker Brackett PLLC (57) ABSTRACT

A system including an annular socket body for tightening a lock ring around a threaded end of a conduit connector extending through an opening in a wall of a junction box is provided. To facilitate capturing of the lock ring by the socket body without interference, the wrench lugs of the socket body each have a circumferential extent that is less than 50% of a circumferential extent between teeth of the lock ring, and there are half as many wrench lugs than teeth. Flat side faces of the wrench lugs are disposed at an angle of between about 15° and 40° relative to sides of the teeth of the lock rings so that the wrench lugs engage the lock ring teeth in a sliding point contact that promotes uniform engagement between the wrench lugs and the lock ring teeth when torque of about 1400 inch-pounds is applied to the socket body.

10 Claims, 6 Drawing Sheets

SYSTEM AND METHOD FOR TIGHTENING LOCK RINGS ONTO CONDUIT CONNECTORS

FIELD

This invention generally relates to the assembling of electrical conduits to junction boxes, and is specifically concerned with a system and method for quickly and easily tightening a lock ring around a threaded end of a conduit connector extending through an opening in a junction box.

BACKGROUND

In the installation of electrical power systems in modern buildings, building codes require the electrical power wires be contained within an arrangement of tubular, metallic conduits that are mechanically connected to junction boxes. In assembling such arrangements, the conduits are serially connected end-to-end via a coupling and are ultimately connected at one end to a junction box via a conduit connector. The conduit connector has a coupling at one end to secure it to the end of the conduit and is threaded at its other end to secure it to a junction box. The junction boxes have one or more circular "knock-out" openings in their side walls for receiving the threaded end of the conduit connector.

Lock rings (sometimes referred to as "lock nuts") are used to secure the threaded end of the conduit connecter to the wall of the junction box. Lock rings are generally annular in shape, having screw threads around their inner diameters for engaging the screw threads on the distal end of the conduit connector. Teeth or lugs protrude from their outer diameters to facilitate the gripping and torquing of the lock ring. The teeth are uniformly shaped and are equidistantly spaced around the circumference of the lock ring. The teeth are usually bent toward one side of the lock ring a few degrees so that the peripheral edges of the teeth engage and find purchase with the side wall of the junction box when the lock ring is tightened. If tightened properly, the lock ring teeth act like cantilever springs whose distal ends are spring-biased against the side wall. While the number of teeth is usually an even number (e.g., six or eight) lock rings having an odd number of teeth are not unknown.

In the usual sequence of assembly, one or more of the "knock-out" portions along the sides of the junction box are removed to create round openings for receiving the threaded end of a conduit connector. The threaded end of the connecter is then inserted into one of the round openings. The electrician then manually screws the lock ring over the threaded end of the connector, taking care to orient the lock ring so that the ends of the bent teeth face toward the wall of the junction box. The electrician may tighten the lock ring by seating a flat-bladed screwdriver or punch over one of the lock ring teeth and striking it with a hammer. Alternatively, channel locks may be used.

In conventional building methods where metallic conduit is required, the electrician typically installs the conduit connectors onto the junction boxes on the building site. The electrician then secures the junction boxes selected locations on the frame of the building. Lengths of electrical conduit are then sized and often bent on site to fit the contours of the building. The ends of the lengths of sized conduit are then inserted into the connectors installed on the junction boxes and secured thereto by the couplings on the outside ends of the connectors, which may include set screws. Electrical wires are then pulled through the lengths of conduit and are electrically connected together in the junction boxes.

More recently, electrical power systems formed from prefabricated modules of junction boxes and conduit assemblies have come into use. The prefabricated modules are assembled off-site and typically include a junction box having conduit connectors that have been installed by a factory worker using either the previously-described screwdriver and hammer technique or channel locks. In many such modules, a parallel array of conduits that have been bent into a shape that conforms with the walls of the building are secured to the connectors on one or both sides of the junction box. The completed modules are then transported to the building site by truck and installed in the building. The use of such prefabricated modules is particularly advantageous in the construction of data centers which require electrical power systems of high density and complexity to power the thousands of computer servers and other equipment housed within such centers.

SUMMARY OF THE INVENTION

While a lock ring may be effectively tightened over a conduit connector using a screwdriver and hammer or channel locks, the applicants have observed a number of shortcomings with these techniques. For example, the limited space provided between the openings and in the corners of the junction box makes it relatively awkward and time-consuming to seat and strike the screwdriver multiple times against one or more teeth of the lock ring. The slipping of the screwdriver blade off of the lock ring tooth during striking may damage the sheet metal walls or other components within the junction box, or cause injury to the factory worker. Additionally, the application of such a momentary torque to only one point of the circumference of the lock ring may result in an uneven engagement between the distal ends of the lock ring teeth and the wall of the junction box due to play between the threads of the lock ring and threads of the conduit connector. This problem is exacerbated in lock rings designed for conduits having relatively large diameters of between 2 and 4 inches. When channel locks are used, the limited workspace provided between the "knock-out" openings and in the corners of the junction box makes the gripping and turning of the lock rings clumsy and difficult. As the lock rings can only be turned a very small angle by the channel locks before mechanical interference prevents further turning, each lock nut must typically be gripped and turned several times to achieve the desired tightness. Hence the use of channel locks is also an awkward and time-consuming way to tighten the lock nuts.

Finally, neither the hammer and screwdriver technique nor the use of channel locks provides a uniform torque to the lock ring that is within a critical range that prevents loosening of the lock ring during the assembly sequence. The applicants have observed that this critical torque range is substantially narrower for prefabricated junction box and conduit assemblies than for conventional on-site construction due to the fact that such prefabricated junction box and conduit assemblies are subjected to substantial amounts of vibration during their transportation from the factory to the building site. Under such conditions, lock rings that would have stayed tightened if installed on-site can loosen as a result of the transportation vibration, requiring them to be re-tightened when installed on-site. While it may be possible to prevent such loosening from occurring by applying a larger than adequate torque to the lock rings at the prefabrication factory, the application of torque beyond a certain limit can cause the distal ends of the lock ring teeth to cut into the junction box wall and form a closed, circular groove. In such a case, the distal teeth ends will seat within the groove with little purchase due to the reduction of spring bias between the peripheral ends of the lock ring teeth and the wall. Excess torques can also result in a stripping of the threads of either the lock ring or the conduit connector. In either case, over-tightening can cause a lock ring to loosen as much as under-tightening when subjected to transportation vibration.

Several wrench-like tools for tightening lock rings are known in the prior art. However, these tools are directed toward tightening lock rings that are less than 2" in diameter. Even if these tools were scaled up to handle lock rings greater than 2" in diameter, they would be heavy and awkward to use within the limited workspace afforded in the corners of the junction box and between the closely-spaced knock-out openings.

Consequently, there is a need for a lock ring tightening system and method that overcomes all the aforementioned shortcomings of the prior art. Ideally, such a system and method should be easily and rapidly positionable over a lock ring within the limited space afforded by the junction box. It should be able to tighten lock rings to conduit connectors without damaging the sheet metal walls or other components within the junction box or causing injury to the factory worker. Such a system and method should apply torque to multiple teeth around the lock ring to ensure an even, co-planar engagement between the peripheral edges of the teeth and the wall of the junction box. Finally, such a system and method should consistently apply a torque within a relatively narrow critical range to each of the lock rings that is sufficient to begin dimpling or grooving between peripheral edges of the lock ring teeth and the wall of the junction box without the formation of a closed annular groove.

To these ends, the system of the invention generally comprises an annular socket body open at one side and closed on an opposite side by an end wall, wherein the inner circumference of the socket body includes a plurality of radially extending wrench lugs, and a driver detachably connectable to the end wall of the annular socket body for applying a predetermined torque to the lock ring sufficient to begin dimpling or grooving between peripheral ends of the lock ring teeth and the wall of the junction box without the formation of a closed annular groove.

To facilitate a rapid capturing of the lock ring by the annular socket body, the wrench lugs each have a circumferential extent that is less than 50% of a circumferential extent between the lock ring teeth. The annular socket body is provided with half as many or less wrench lugs than teeth disposed around the lock ring. A radial gap is provided between the distal ends of the lock ring teeth and the inner diameter of the annular socket body that is between about 80%-100% of the radial extent of the lock ring teeth. All of these structural features facilitate a rapid capturing of the lock ring by the annular socket body without mechanical interference when the socket body is placed over the lock ring. Finally, the radial thickness of the annular wall of the socket body is between about 133% to 200% of the radial length of the teeth of the lock ring. Such a relatively thin annular wall minimizes the diameter of the socket body which helps to avoid mechanical interference when the socket body is manipulated in the corners of the junction box and between closely-spaced conduit connectors, and reduces the over-all weight of the socket body.

To promote a uniform, multi-point application of torque to the lock ring, the wrench lugs have flat side faces that are disposed at an angle of between about 15° and 40° relative to sides of the teeth of the lock rings. The radial gap between the distal ends of the lock ring teeth and the inner diameter of the annular socket body is between about 80%-100% of the radial extent of the lock ring teeth, and the radial extent of the wrench lugs overlaps between about 33% and 50% of the radial extent of the lock ring teeth, thereby providing a substantial amount of "play" between the inner diameter of the socket body and the lock ring teeth. When an amount of torque is applied that is sufficient to begin dimpling or grooving between peripheral edges of the lock ring teeth and the wall of the junction box, the wrench lugs engage the lock ring teeth in a sliding point contact, and the socket body moves slightly along the plane of the lock ring as a result of the "play" afforded by the radially-oriented gap to position most or all of the wrench lugs into engagement with the lock ring teeth.

The invention further includes a method for tightening a lock ring around a threaded end of a conduit connector extending through an opening in a wall of a junction box, comprising the steps of: manually threading the lock ring over the threaded end of the conduit connector; capturing the threaded lock ring with an annular socket body as described with respect to the system of the invention, and applying a predetermined torque to the lock ring sufficient to begin dimpling between peripheral ends of the lock ring teeth and the wall of the junction box without the formation of a closed annular groove in the wall of the junction box.

DETAILED DESCRIPTION OF THE PREFERRED EMBODIMENT

Figure 1:
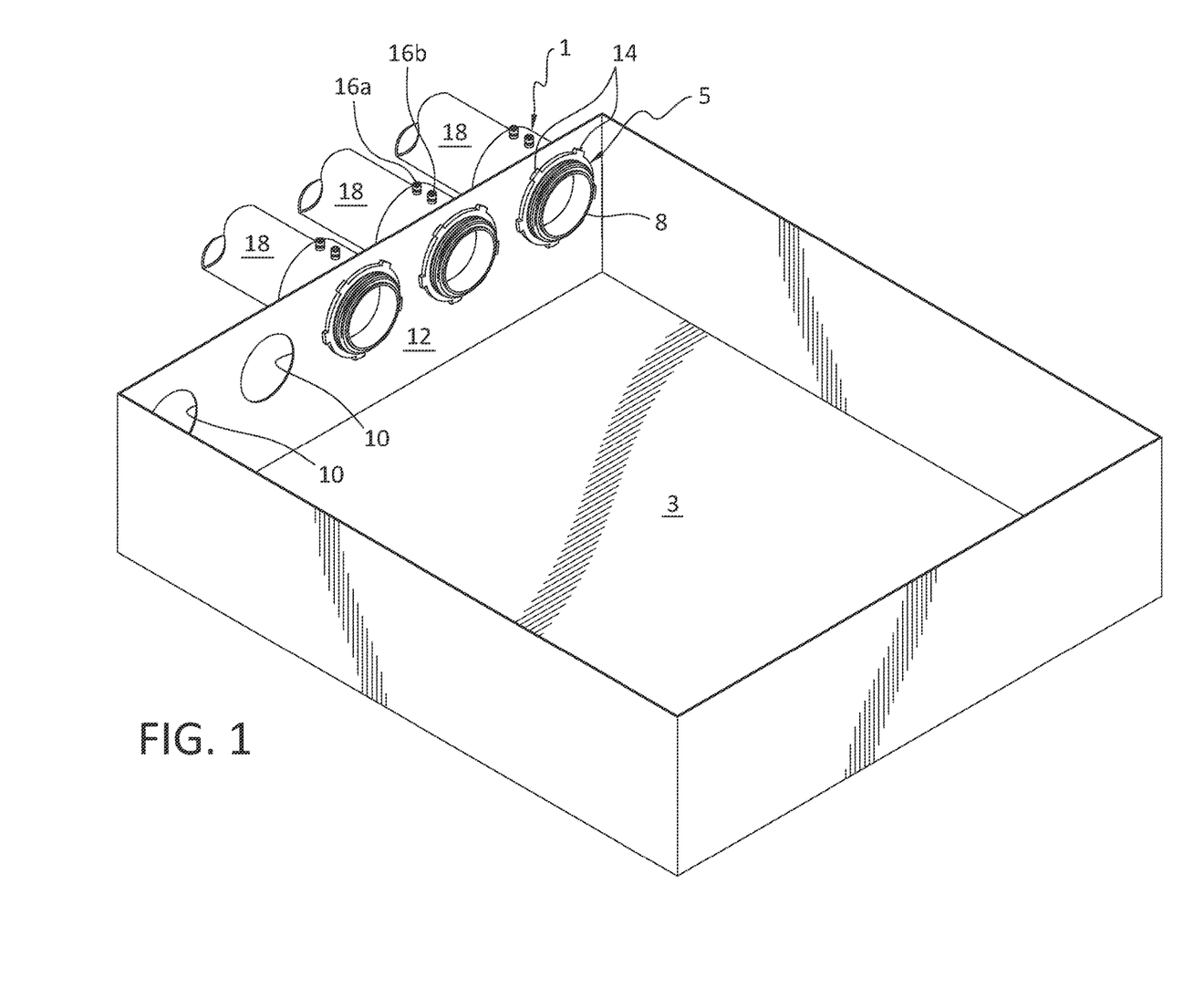
FIG. 1 is a perspective view of a junction box with a row of conduit connectors installed therein.
Figure 2:
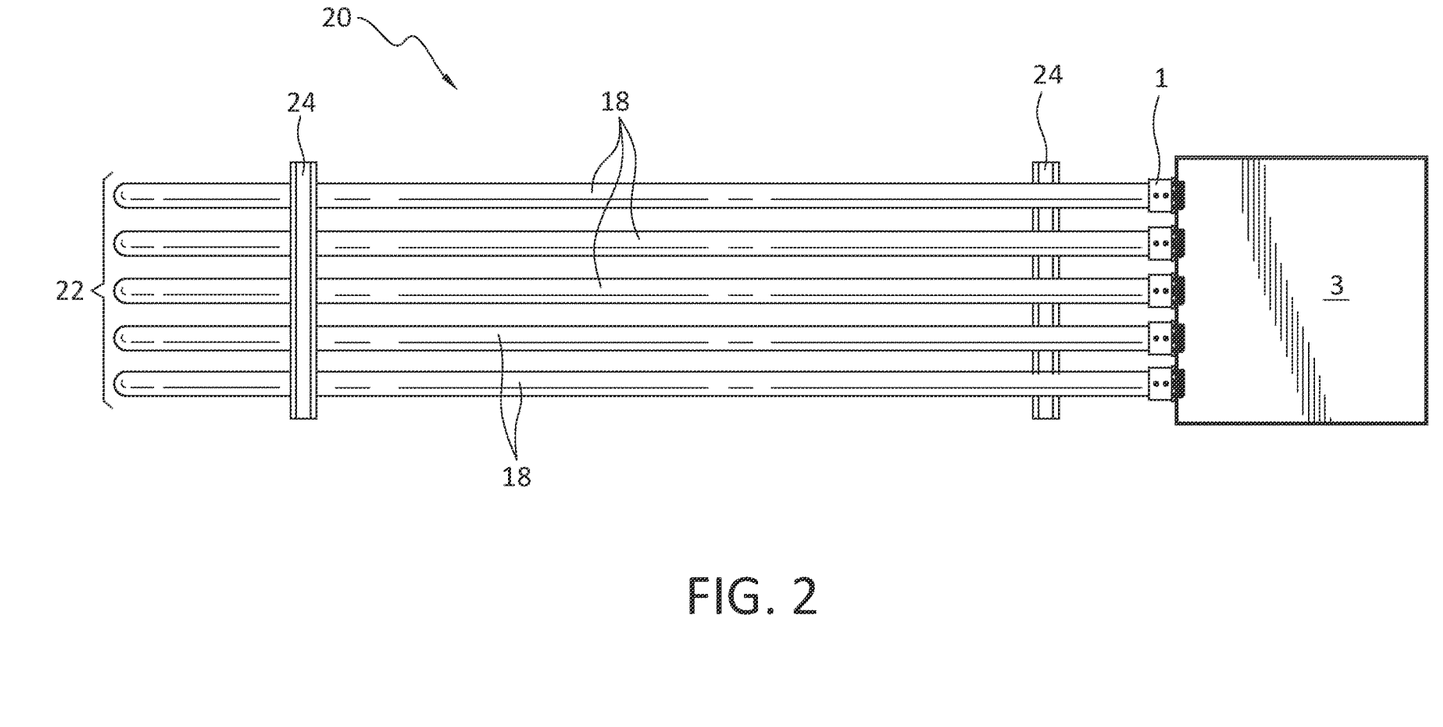
FIG. 2 is a plan view of a prefabricated module of an electrical power system including a junction box, conduit connectors, and an array of electrical conduits.

With reference now to FIGS. 1 and 2, the system and method of the invention assembles conduit connectors 1 to electrical junction boxes 3 by tightening lock rings 5 over the threaded end 8 of the connector 1. During assembly, the threaded end 8 is extended through one of the circular openings 10 formed by removing a knock-out in the wall 12 of the junction box 3. An electrician or factory worker then manually screws a lock ring 5 over the threaded end 8 of the connector 1. As described in detail hereinafter, the system of the invention tightens the lock ring 5 to within a predetermined range of torque such that the teeth 14 of the lock ring begin to dimple the wall 12 of the junction box 3. Set screws 16a, 16b are provided on the connector 1 opposite to the threaded end 8. These set screws 16a, 16b are used to clampingly secure one end of a tubular, metallic conduit 18 to the connector end that protrudes out of the junction box 3. As is illustrated in FIG. 2, the system and method of the invention are particularly useful in the assembly of electrical power modules 20, which may comprise a junction box 3 with pre-installed connectors 1, or the combination of a junction box 3, connectors 1, and an array 22 of conduits 18 held together in a parallel arrangement via clamping straps 24.

Figure 3A:
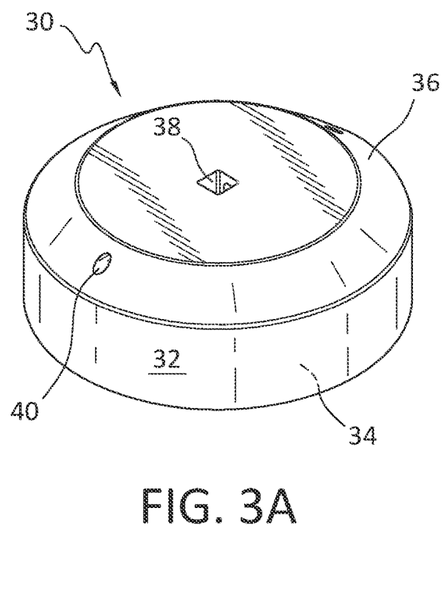
FIG. 3A is an outside perspective view of the annular socket body of the system of the invention.
Figure 3B:
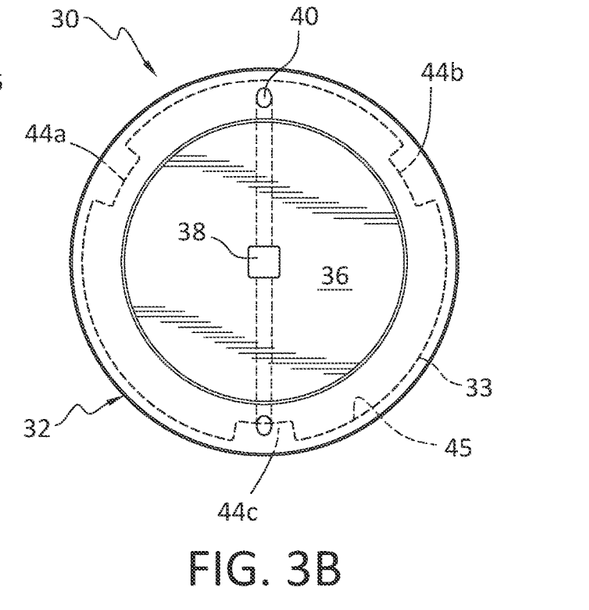
FIG. 3B is a top plan view of the socket body illustrated in FIG. 3A.
Figure 3C:
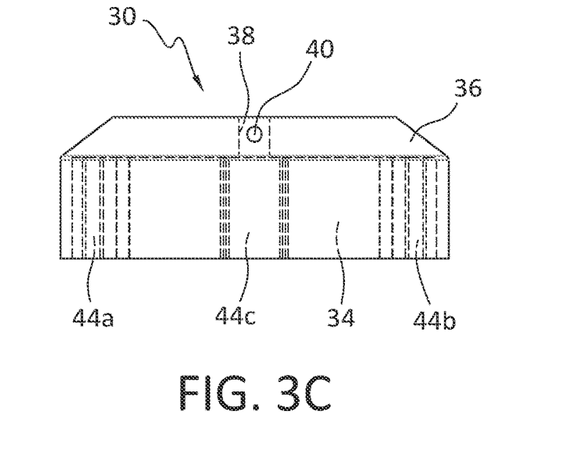
FIG. 3C is a side view of the socket body illustrated in FIG. 3A.

As shown in FIGS. 3A-3C, the socket 30 that forms part of the system of the invention includes an annular socket body 32 having an annular wall 33. The socket body 32 has an open end 34 for receiving a lock ring 5, and a closed end covered by a circular wall 36. The circular wall 36 includes a square detent opening for receiving the output shaft of a driver such as a pneumatic or electric torque wrench. The circular wall 36 further includes a diametral bore 40 for housing a spring and detent ball (not shown) for providing a detachable coupling between the socket body 32 and the output shaft of a driver. In order to reduce mechanical interference between the socket body 32 and a lock ring 5 during the tightening operation, the socket body 32 has half as many wrench lugs 44a-c or less than the number of teeth 14 of the lock ring 5. As this embodiment of the socket 30 is directed toward the tightening of lock rings 5 having six equidistantly spaced teeth 14, three wrench lugs 44a-c spaced 120° apart are provided around the inner surface 45 of the socket body 32. The socket body 32v is formed from tool steel, and the wrench lugs 44a-c are integrally formed with the annular wall 33 of the socket body 32 for strength and durability.

Figure 3D:
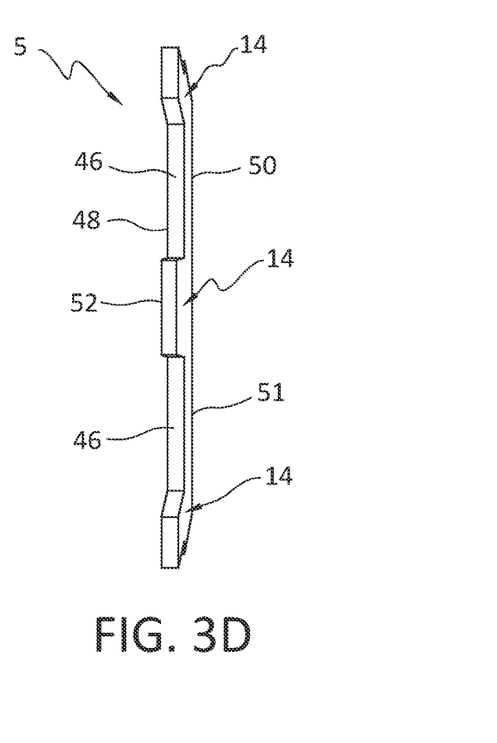
FIG. 3D is a side view of a lock ring, illustrating how the lock ring teeth are bent to one side.
Figure 3E:
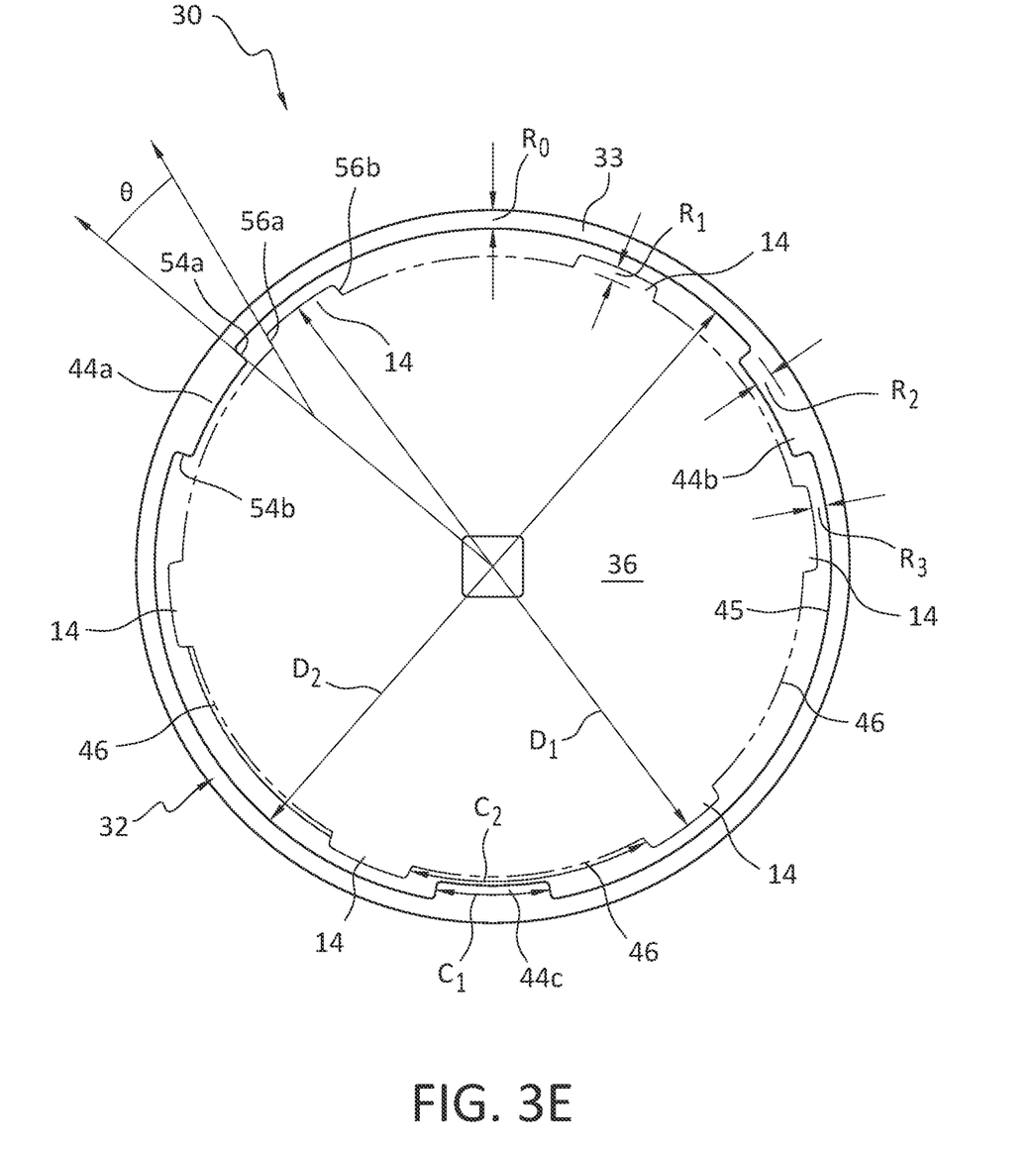
FIG. 3E is a plan view of the socket body illustrated in FIG. 3A, illustrating the spacing between the inner wall and wrench lugs of the socket body and the teeth of lock ring indicated in phantom, as well as the angle between the sides of the wrench lugs and the sides of the lock ring teeth.

With specific reference to FIGS. 3D and 3E, the lock rings 5 forming part of this exemplary embodiment of the inventive system include six teeth 14 around their outer diameter. The teeth 14 are circumferentially spaced 60° from one another and define annular gaps 46 around the outer diameter of the lock rings 5. The teeth 14 are slightly bent toward a same face of the lock rings 5 as shown in FIG. 3D which defines the inside face 48 of the lock rings 5. The opposite side of the lock rings 5 defines the outside face 50 in this application. During the tightening operation, the lock rings 5 are oriented so that their inside faces 48 face the wall 12 of the junction box 3 so that the outer edges 52 of the teeth 14 bite into the junction box wall 12, as will be scribed in detail hereinafter. The lock rings 5 further have a threaded inner diameter 51 for engaging the threaded end 8 of a conduit connector 1.

With specific reference to FIG. 3E, the wrench lugs 44a-c each have flat, opposing side walls 54a, b. These walls 54a, b are parallel to the radius of the annular socket body 32. The teeth 14 of the lock rings 5 also have flat, opposing side walls 56a, b. However, the side walls 56a, b of the teeth 14 are each angled away from the radius of the socket body 32 such that the side walls 44a, b of the wrench lugs 44a-c are disposed at an angle θ with respect to the side walls 56a, b of each tooth 14. Consequently, during a tightening operation where the socket body 32 rotates counterclockwise as seen from FIG. 3E, the side wall 54b of one or more of the wrench lugs 44a-c engages the side wall 56b of three of the six the teeth 14 of lock ring 5 at the angle θ in a sliding point contact that promotes uniform engagement between the wrench lugs and the lock ring teeth. If the inner surface 45 of the annular socket body 32 and the lock ring 5 are slightly non-concentric at the beginning of such a tightening operation, only the side wall 54b of only one of the wrench lugs 44a-c may engage the side wall 56b of only one of the teeth 14. However, the sliding point contact provided by the angle θ between the wrench lug walls 54b and tooth walls 56b in combination with the relatively high amount torque applied to the socket 30 advantageously causes the socket 30 to move into concentricity with the lock ring 5, thereby bringing two or three of the wrench lugs 44a-c into contact with the side wall 56b of two or three of the teeth 14. Such a centering movement promotes a uniform application of torque around the lock ring 5 that advantageously suppresses planar misalignment between the teeth 14 of the lock ring 5 as they engage the wall 12 of the junction box 3. The angle θ is between about 15° and 40°. An angle less than 15° may not generate enough sliding point contact to apply a centering force onto the socket body 32. An angle greater than 40° may result in binding between the wrench lugs 44a-c and the teeth 14 that interferes with the removal of the socket 30 from the lock ring 5 after a tightening operation.

FIG. 3E illustrates four additional structural features of the socket 30 which reduce the probability of mechanical interference when the socket 30 is used to tighten lock rings 5 when assembling electrical power modules 20. First, the circumferential extent $C_1$ of each of the wrench lugs 44a-c is 50% or less than the circumferential extent $C_2$ of the annular gaps 46 between the teeth 14 of the lock rings 5. In one preferred embodiment, $C_1$ is between about 40% to 50% of $C_2$. Such relative proportioning substantially increases the probability that the wrench lugs 44a-c will be received within the annular gaps 46 of the lock ring 5 without striking the teeth 14 when the socket 30 is positioned over a lock ring 5. Second, the radial thickness $R_0$ of the annular wall 33 of the socket body 32 is between about 133% to 200% of a radial extent $R_1$ of the teeth 14 of the lock ring 5. For a socket 30 capable of tightening a lock ring 4" in diameter, this radial thickness $R_0$ might be between about ⅛" and 3/16", while the radial extent $R_1$ of the teeth 14 is about 3/32". In terms confined exclusively to the socket body 32, the radial thickness $R_0$ of the annular wall 33 of the socket body 32 is only about 3%-4% of the inner diameter D2 of the annular wall 33. Such a relatively thin annular wall 33 reduces the diameter of the socket 30, making it easier to manipulate in the small workspaces provided in the corners of the junction box 3 and between the cut-out openings 10. It also lowers the weight of the socket 30, making it easier for the factory worker to manipulate and less strenuous to support. Third, when the lock ring 5 is concentric with the socket body 32, a radial gap $R_3$ between about 80% to 100% of a radial extent of the lock ring teeth 14 is provided between the outer edges 52 of the lock ring teeth 14 and the inner surface 45 of the annular wall 33 of the socket body 32. Such relative proportioning not only reduces the probability of interference between the outer edges 2 of the teeth 14 and the annular wall 32 of the socket body 32 when the socket 30 is positioned over the lock ring 5, but also facilitates the centering movement between the socket 30 and the lock ring 5 described earlier. Finally, the radial length $R_2$ of the wrench lugs 44a-c is only between about 133% to 150% of the radial length $R_1$ of the teeth 14. Hence, when the when the lock ring 5 is concentric with the socket body 32, the wrench lugs 44a-c overlap only about the outer one-third to one-half of the teeth 14. Such relative proportioning helps to avoid mechanical interference between the inner surfaces of the wrench lugs 44a-c and the outer surfaces of the annular gaps 46 between the teeth 14.

Figures 4A, 4B:
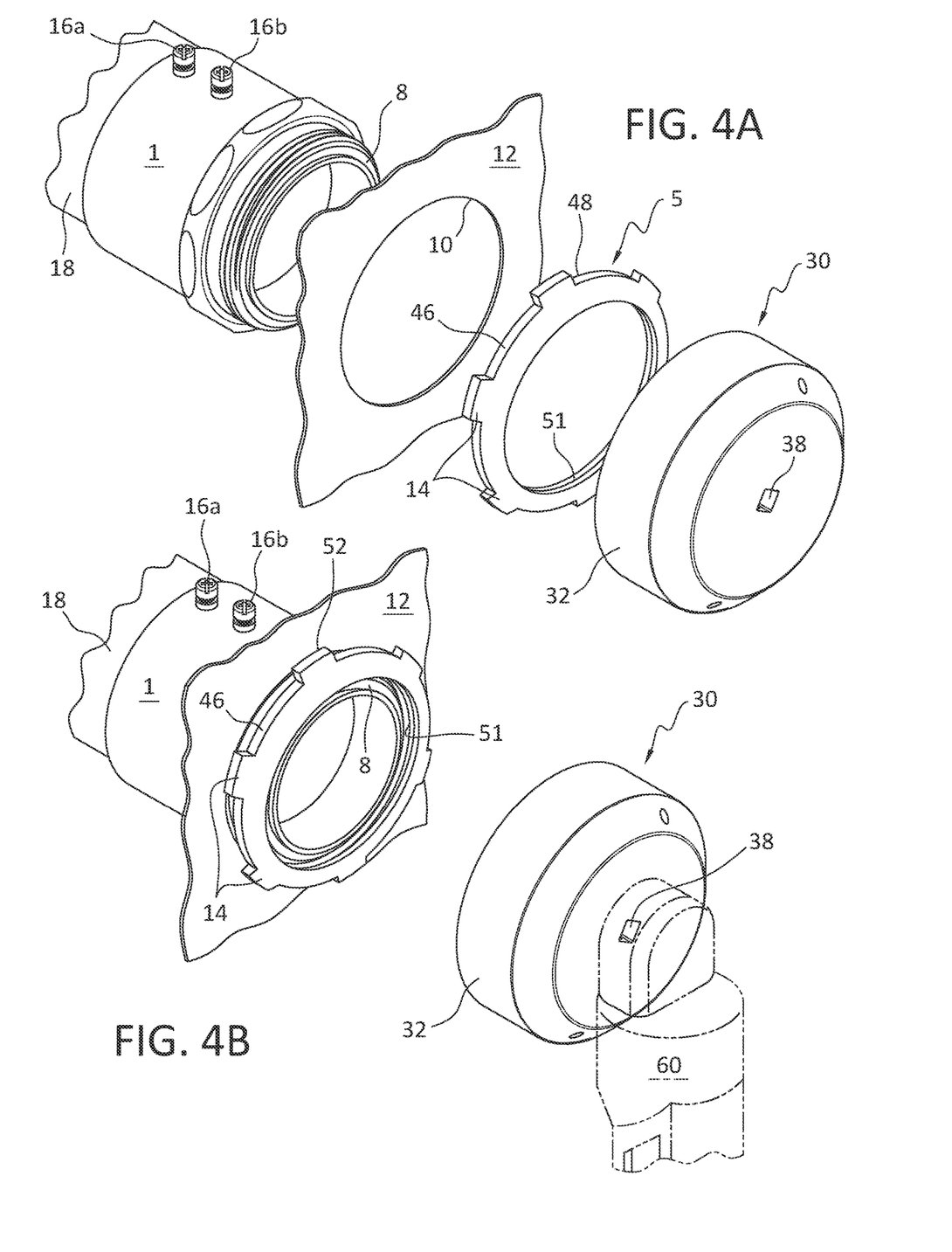
FIG. 4A is an exploded view of a conduit connector, a section of a junction box wall having a knock-out opening, a lock ring to be threaded over the conduit connector, and the annular socket body of the system of the invention.
FIG. 4B is a perspective view of a conduit connector extending through the knock-out opening in a wall of a junction box with a lock ring that has been manually threaded over the conduit connector, and the socket body and driver used to tighten the lock ring.

Turning now to FIGS. 4A and 4B, the system of the invention further includes a driver 60 that is preferably right-angled as shown to allow the factory worker to easily manipulate the socket 30 within the small workspaces present at the corners of the junction box 3 and between the openings 10 along the junction box wall 12. The driver 60 includes a torque control (not shown) that allows the factory worker to set the torque applied by the driver 60 to the lock ring 5 to between about 1200 to 1400 inch-pounds of torque. The driver 60 includes a drive shaft (not shown) which is detachably connectable to the square detent opening 38 of the socket 30 via the spring and detent ball housed within the diametral bore 40. The driver 60 may be one of several commercially available products and forms no part of the invention per se.

FIGS. 4A-4D illustrate how the previously described system implements the method of the invention. In the first step of the method, one or more connectors 1 is extended through one of the openings 10 present in a side wall 12 of a junction box 3. Next, the factory worker manually threads a lock ring 5 over the threaded end 8 of the connector 1, taking care that the lock ring 5 is oriented so that its inside face 48 faces the junction box wall 12. In such an orientation, the teeth 14 of the lock ring 5 will be bent toward the wall 12 such that the outer teeth edges 52 become the closest points between the wall 12 and the lock ring 5. As illustrated in FIG. 4B, the worker manually threads the lock ring 5 until the teeth edges 52 are either directly adjacent to or in direct contact with the junction box wall 12.

Figures 4C, 4D:
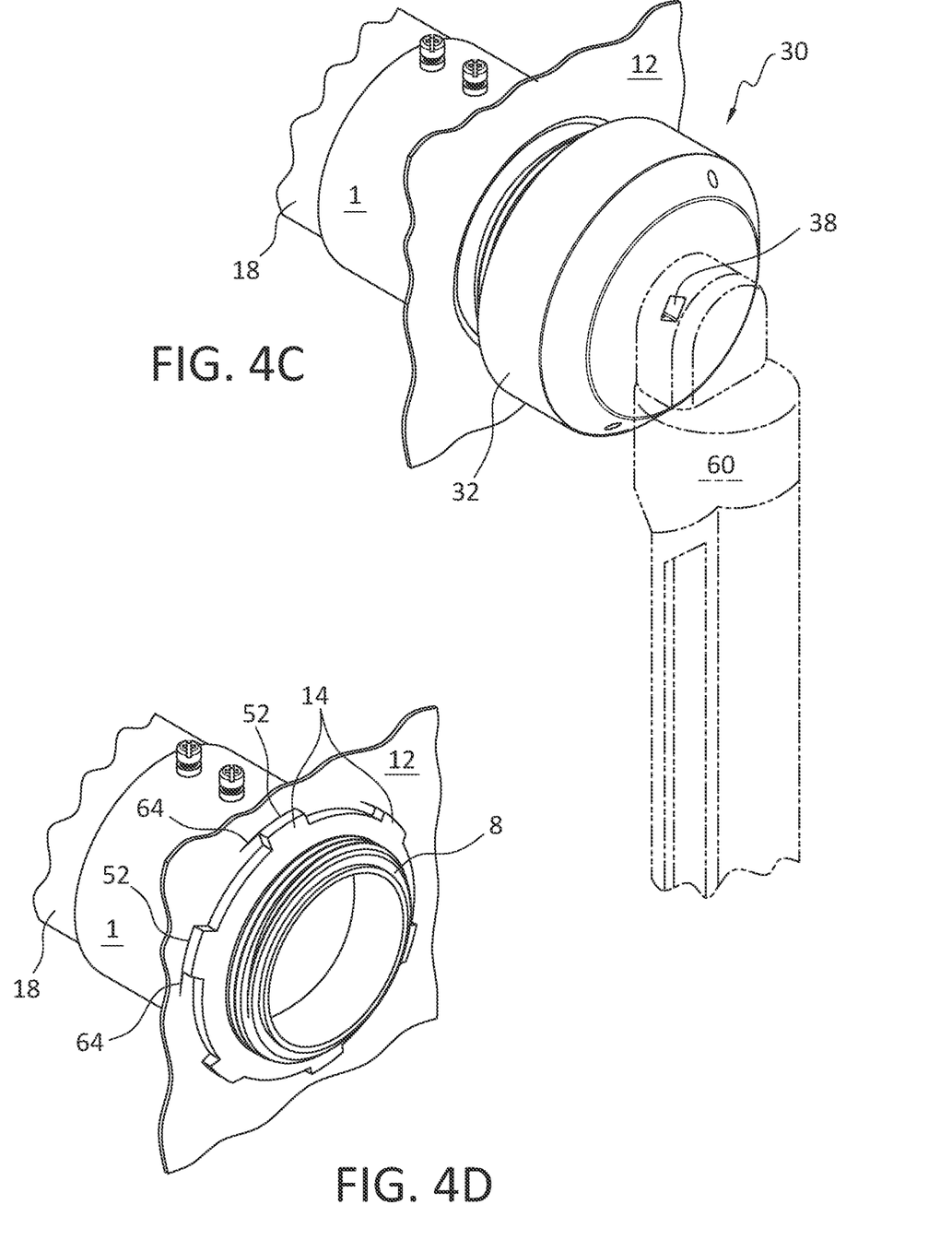
FIG. 4C is a perspective view of the socket body and driver applying torque to the lock ring shown in FIG. 4B.
FIG. 4D is a perspective view of the lock ring of FIG. 4C after being properly torqued by the socket body and driver.

When the manual threading of the lock ring 5 has been completed, the factory worker positions the interconnected socket 30 and driver 60 over the threaded lock ring 5 as shown in FIG. 4B, and then proceeds to capture the lock ring 5 within the annular socket body 32 as shown in FIG. 4C. A rapid capturing of the lock ring 5 without mechanical interference between the lock ring teeth 14, wrench lugs 44a-c, and annular wall 33 is facilitated by all of the previously-discussed structural features of the socket body 32. The factory worker then actuates the driver 60. At this juncture, the sliding point contact provided by the angle θ between the wrench lug walls 54b and tooth walls 56b in combination with the relatively high amount torque applied to the socket 30 advantageously causes the socket 30 to move into concentricity with the lock ring 5, thereby bringing two or three of the wrench lugs 44a-c into contact with the side wall 56b of two or three of the teeth 14. As previously pointed out, the application of torque to two or three points around the circumference of the lock ring 5 advantageously suppresses planar misalignment between the teeth 14 of the lock ring 5 as they engage the wall 12 of the junction box 3.

Prior to the actuation of the driver 60, the torque has been pre-adjusted to a level which will cause the teeth 14 of the lock ring 5 to begin dimpling or grooving the wall 12 of the junction box 3 without the formation of a closed annular groove in the wall 12. The applicants have observed that the application of a torque of between about 1220 and 1400 inch-pounds typically achieves this goal for lock rings 5 having a diameter of between 2" and 4". As shown in FIG. 4D, if the torque has been adjusted properly, the outer teeth edges 52 will form a pattern of discontinuous dimples or grooves 64 in the wall 12 that trace a "phantom circle" just before the driver 60 de-actuates due to the torque limit being exceeded. These dimples or grooves 64 widen and deepen along their lengths due to the screw thread such that the outer teeth edges 52 are seated at slightly different depths along their lengths, thus providing a positive "bite" into the wall 12. The fact that the teeth 14 are slightly bent toward the wall 12 biases the outer teeth edges 52 into the dimples or grooves 64 in cantilever spring fashion. This spring bias, in combination with the bite between the outer teeth edges 52 and the wall 12 that forms the dimples or grooves 64, securely affixes the lock ring 5 in place such that it will not loosen when subjected to the vibration that accompanies the transportation of the resulting junction box modules 20 from the factory to the building site.

The invention claimed is:

1. A system for tightening a lock ring around a threaded end of a conduit connector extending through an opening in a wall of a junction box, comprising:

the lock ring having a plurality of lock teeth extending a same radial length from its outer periphery and being uniformly spaced around its outer periphery, each tooth having opposing flat sides, an annular socket body having an annular wall that is open at one side and closed on an opposite side by an end wall, and including a plurality of wrench lugs radially extending from an inner surface of the annular wall and being uniformly spaced around the inner surface, the wrench lugs each having a circumferential extent that is less than 50% of a circumferential extent between the plurality of teeth disposed around the outer periphery of the lock ring, and there being half as many wrench lugs than the number of the plurality of teeth disposed around the lock ring to facilitate capturing of the lock ring by the annular wall of the socket body without mechanical interference, wherein the annular socket body is moveable from a concentric position over the lock ring to a maximally non-concentric position over the lock ring, wherein the plurality of wrench lugs are configured to come into a contacting position with the side of one of the lock ring teeth at the maximally non-concentric position, and wherein the radially extending wrench lugs have flat side faces on either side that are radially disposed at an angle relative to the opposing flat sides of the plurality of teeth of the lock rings such that the wrench lugs engage the lock ring teeth in a sliding point contact that promotes uniform engagement between the wrench lugs and the lock ring teeth when torque is applied to the annular socket body.

2. The system for tightening the lock ring defined in claim 1, wherein the angle at which the flat side faces on either side of the wrench lugs are disposed between 15° and 40° relative to the sides of the plurality of teeth of the lock rings.

3. The system for tightening the lock ring defined in claim 1, wherein a radial thickness of the annular wall of the socket body is between 100% to 150% of a radial length of the teeth of the lock ring.

4. The system for tightening the lock ring defined in claim 1, wherein a radial thickness of the annular wall of the socket body is between 3%-4% of an inner diameter of the annular socket body.

5. The system for tightening the lock ring defined in claim 1, wherein when the annular socket body is concentrically positioned over the lock ring, a radial gap between the distal ends of the lock ring teeth and the inner diameter of the annular socket body is between 80% to 100% in comparison to the radial extent of the lock ring teeth.

6. The system for tightening the lock ring defined in claim 1, wherein a radial extent of the wrench lugs overlaps between 33% and 50% of the radial extent of the lock ring teeth when the lock ring is concentric with annular socket body.

7. The system for tightening the lock ring defined in claim 1, wherein a radial length of the wrench lugs is 133%-150% of a radial length of the teeth.

8. The system for tightening the lock ring defined in claim 1, wherein the circumferential extent of the wrench lugs is greater than 40% of the circumferential extent of the distances between teeth disposed around the outer periphery of the lock ring.

9. A system for tightening a lock ring around a threaded end of a conduit connector extending through an opening in a wall of a junction box, comprising:

the lock ring having a plurality of lock teeth extending a same radial length from its outer periphery and being uniformly spaced around its outer periphery, each tooth having opposing flat sides, an annular socket body having an annular wall that is open at one side and closed on an opposite side by an end wall, and including three wrench lugs radially extending from an inner surface of the annular wall and being uniformly spaced around the inner surface, the wrench lugs each having a circumferential extent that is less than 50% of a circumferential extent between the plurality of teeth disposed around the outer periphery of the lock ring, and there being half or less as many wrench lugs than the number of the plurality of teeth disposed around the lock ring to facilitate capturing of the lock ring by the annular wall of the socket body without mechanical interference, wherein the annular socket body is moveable from a concentric position over the lock ring to a maximally non-concentric position over the lock ring, wherein the wrench lugs are configured to come into a contacting position with the side of one of the plurality of lock ring teeth at the maximally non-concentric position, and wherein the wrench lugs have flat side faces on either side that are radially disposed at an angle relative to sides of the teeth of the lock rings such that the wrench lugs engage the lock ring teeth in a sliding point contact that promotes uniform engagement between the wrench lugs and the lock ring teeth when torque is applied to the annular socket body.

10. A system for tightening a lock ring around a threaded end of a conduit connector extending through an opening in a wall of a junction box, comprising:

the lock ring having a plurality of lock teeth extending a same radial length from its outer periphery and being uniformly spaced around its outer periphery, each tooth having opposing flat sides, an annular socket body having an annular wall that is open at one side and closed on an opposite side by an end wall, and including a plurality of wrench lugs radially extending from an inner surface of the annular wall and being uniformly spaced around the inner surface, the wrench lugs each having a circumferential extent that is less than 50% of a circumferential extent between the plurality of teeth disposed around the outer periphery of the lock ring, and there being half as many wrench lugs than the number of the plurality of teeth disposed around the lock ring to facilitate capturing of the lock ring by the annular wall of the socket body without mechanical interference, wherein the annular socket body is moveable from a concentric position over the lock ring to a maximally non-concentric position over the lock ring, wherein the plurality of wrench lugs are configured to come into a contacting position with the side of one of the lock ring teeth at the maximally non-concentric position, wherein a radial extent of the wrench lugs overlaps between about 33% and 50% of the radial extent of the lock ring teeth when the lock ring is concentric with annular socket body, and wherein the wrench lugs have flat side faces on either side that are radially disposed at an angle relative to sides of the teeth of the lock rings such that the wrench lugs engage the lock ring teeth in a sliding point contact that promotes uniform engagement between the wrench lugs and the lock ring teeth when torque is applied to the annular socket body.

* * * * *